US011157002B2

(12) United States Patent
Poornachandran et al.

(10) Patent No.: US 11,157,002 B2
(45) Date of Patent: Oct. 26, 2021

(54) METHODS, SYSTEMS, ARTICLES OF MANUFACTURE AND APPARATUS TO IMPROVE AUTONOMOUS MACHINE CAPABILITIES

(71) Applicant: Intel Corporation, Santa Clara, CA (US)

(72) Inventors: Rajesh Poornachandran, Portland, OR (US); Nagasubramanian Gurumoorthy, Portland, OR (US); Ravishankar Iyer, Portland, OR (US); Lakshman Krishnamurthy, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 390 days.

(21) Appl. No.: 15/856,310

(22) Filed: Dec. 28, 2017

(65) Prior Publication Data
US 2019/0049966 A1 Feb. 14, 2019

(51) Int. Cl.
G05D 1/00 (2006.01)
H04W 4/46 (2018.01)
H04L 29/08 (2006.01)
H04W 4/38 (2018.01)
B64C 39/02 (2006.01)
G05B 15/02 (2006.01)
(Continued)

(52) U.S. Cl.
CPC ........... G05D 1/0088 (2013.01); B64C 39/02 (2013.01); B64C 39/024 (2013.01); G01C 21/005 (2013.01); G05B 15/02 (2013.01); G06F 9/5011 (2013.01); G06Q 10/00 (2013.01); H04L 67/12 (2013.01); H04W 4/38 (2018.02); H04W 4/46 (2018.02); H04W 4/70 (2018.02); B64C 2201/141 (2013.01); H04W 4/023 (2013.01)

(58) Field of Classification Search
CPC ...................................................... H04L 29/08
See application file for complete search history.

(56) References Cited

U.S. PATENT DOCUMENTS

2007/0016340 A1* 1/2007 Soudier ..................... B60L 3/04
701/1
2007/0073526 A1* 3/2007 Maebayashi ........... G06Q 10/06
703/8
(Continued)

OTHER PUBLICATIONS

D'Aliessi, "How Does the Blockchain Work? The blockchain technology explained in simple words", Jun. 1, 2016, retrieved from https://medium.com/@micheledaliessi/how-does-the-blockchain-work-9, on Nov. 28, 2017, 20 pages.

Primary Examiner — Ario Etienne
Assistant Examiner — Sm Z Islam
(74) Attorney, Agent, or Firm — Hanley, Flight & Zimmerman, LLC

(57) ABSTRACT

Methods, systems, articles of manufacture and apparatus are disclosed to improve autonomous machine capabilities. An example disclosed apparatus includes an agent task manager to retrieve native sensor input data from a sensor of the agent, an agent characteristics engine to identify environmental characteristics based on the retrieved native sensor input data, and a resource allocation modifier to allocate a first quantity of resources of the agent based on a likelihood score associated with the environmental characteristics.

27 Claims, 10 Drawing Sheets

(51) Int. Cl.
*H04W 4/70* (2018.01)
*G01C 21/00* (2006.01)
*G06Q 10/00* (2012.01)
*G06F 9/50* (2006.01)
*H04W 4/02* (2018.01)

(56) References Cited

U.S. PATENT DOCUMENTS

| | | | |
|---|---|---|---|
| 2007/0225882 A1* | 9/2007 | Yamaguchi | B60W 30/095 |
| | | | 701/36 |
| 2016/0046237 A1* | 2/2016 | Sugimoto | B60R 1/00 |
| | | | 348/148 |
| 2018/0075538 A1* | 3/2018 | Konrardy | G06Q 40/08 |
| 2018/0188037 A1* | 7/2018 | Wheeler | H04L 67/12 |
| 2018/0255122 A1* | 9/2018 | Hu | H04L 47/72 |
| 2019/0179320 A1* | 6/2019 | Pacala | G08G 1/166 |
| 2020/0275244 A1* | 8/2020 | Lee | H04L 27/2607 |

* cited by examiner

300

302 304

| IDENTIFIED MODEL CHARACTERISTICS | SCORE |
|---|---|
| VEHICLE TYPE TRUCK | 0.69 |
| VEHICLE TYPE SEDAN | 0.51 |
| VEHICLE TYPE SUV | 0.88 |
| VEHICLE TYPE AMBULANCE | 0.89 |
| ROAD – DEBRIS | 0.87 |
| ROAD – PEDESTRIAN | 0.79 |
| ROAD – CONSTRUCTION | 0.15 |
| AUDITORY – CONSTRUCTION | 0.10 |
| AUDITORY – EMERGENCY PERSONNEL | 0.90 |
| AUDITORY – AIRPORT | 0.05 |
| AUDITORY – RAIN | 0.75 |
| OPTICAL – FOG | 0.41 |
| OPTICAL – RAIN | 0.81 |
| CONTEXT – DRIVING | 0.91 |
| CONTEXT – FLYING | 0.05 |
| CONTEXT – FREEWAY | 0.90 |
| CONTEXT – LOW SPEED | 0.90 |
| CONTEXT – CURVY ROAD | 0.09 |
| CONTEXT – GRANULAR MAP DETAIL | 0.95 |
| ⋮ | ⋮ |
| CONTEXT – LOW BATTERY CAPACITY | 0.75 |
| CONTEXT – PROXIMATE AGENT | 0.91 |

FIG. 3

| | CHARACTERISTIC | THRESHOLD | ACTION | ASSOCIATED PROFILE |
|---|---|---|---|---|
| 410 | CONTEXT – FREEWAY | > 50% — 454 | REDUCE ROUTE PLANNING RESOURCE ALLOCATION BY 10% — 456 | ROUTE PLAN |
| 412 | CONTEXT – FREEWAY AND CONTEXT – GRANULAR MAP DETAIL | > 50% > 70% | REDUCE ROUTE PLANNING RESOURCE ALLOCATION BY 15% | ROUTE PLAN |
| | ... | ... | ... | ... |
| | ROAD – DEBRIS | > 50% | INCREASE NAVIGATION/AVOIDANCE RESOURCES BY 15% | NAVIGATION |
| | ROAD – DERBIS AND ROAD – PEDESTRIANS | > 50% > 50% | INCREASE NAVIGATION/AVOIDANCE RESOURCES BY 25% | NAVIGATION |
| | ... | ... | ... | ... |
| | AUDITORY – EMERGENCY PERSONNEL | > 65% | INCREASE AMBIENT SENSING RESOURCES BY 10% | AMBIENT SENSING |
| | AUDITORY – EMERGENCY PERSONNEL AND AUDITORY – RAIN | > 50% > 50% | INCREASE AMBIENT SENSING RESOURCES BY 15% | AMBIENT SENSING |
| 414 | AUDITORY – EMERGENCY PERSONNEL AUDITORY – RAIN OPTICAL – RAIN | > 45% > 40% > 50% | INCREASE AMBIENT SENSING RESOURCES BY 25% | AMBIENT SENSING |
| | ... | ... | ... | ... |

FIG. 4

METHODS, SYSTEMS, ARTICLES OF MANUFACTURE AND APPARATUS TO IMPROVE AUTONOMOUS MACHINE CAPABILITIES

FIELD OF THE DISCLOSURE

This disclosure relates generally to autonomous machines, and, more particularly, to methods, systems, articles of manufacture and apparatus to improve autonomous machine capabilities.

BACKGROUND

In recent years, autonomous devices, such as autonomous vehicles (e.g., cars, trucks), autonomous robots and autonomous drones, have appeared in a wide variety of industries. For instance, the shipping industry has been road testing semi-trucks that can deliver payloads without human operators, and consumer vehicle manufacturers (e.g., Tesla®) include self-driving capabilities for some cars. Further, several consumer vehicle manufacturers include driver assist features that monitor the surroundings of the vehicle for obstructions and, in some examples, take corrective actions on behalf of the driver in a semi-autonomous manner.

BRIEF DESCRIPTION OF THE DRAWINGS

FIG. 3 is an example characteristics score table generated by the example autonomous agent of FIGS. 1 and 2.

FIG. 4 is an example agent profile map generated by the example autonomous agent of FIGS. 1 and 2.

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Figure 1:
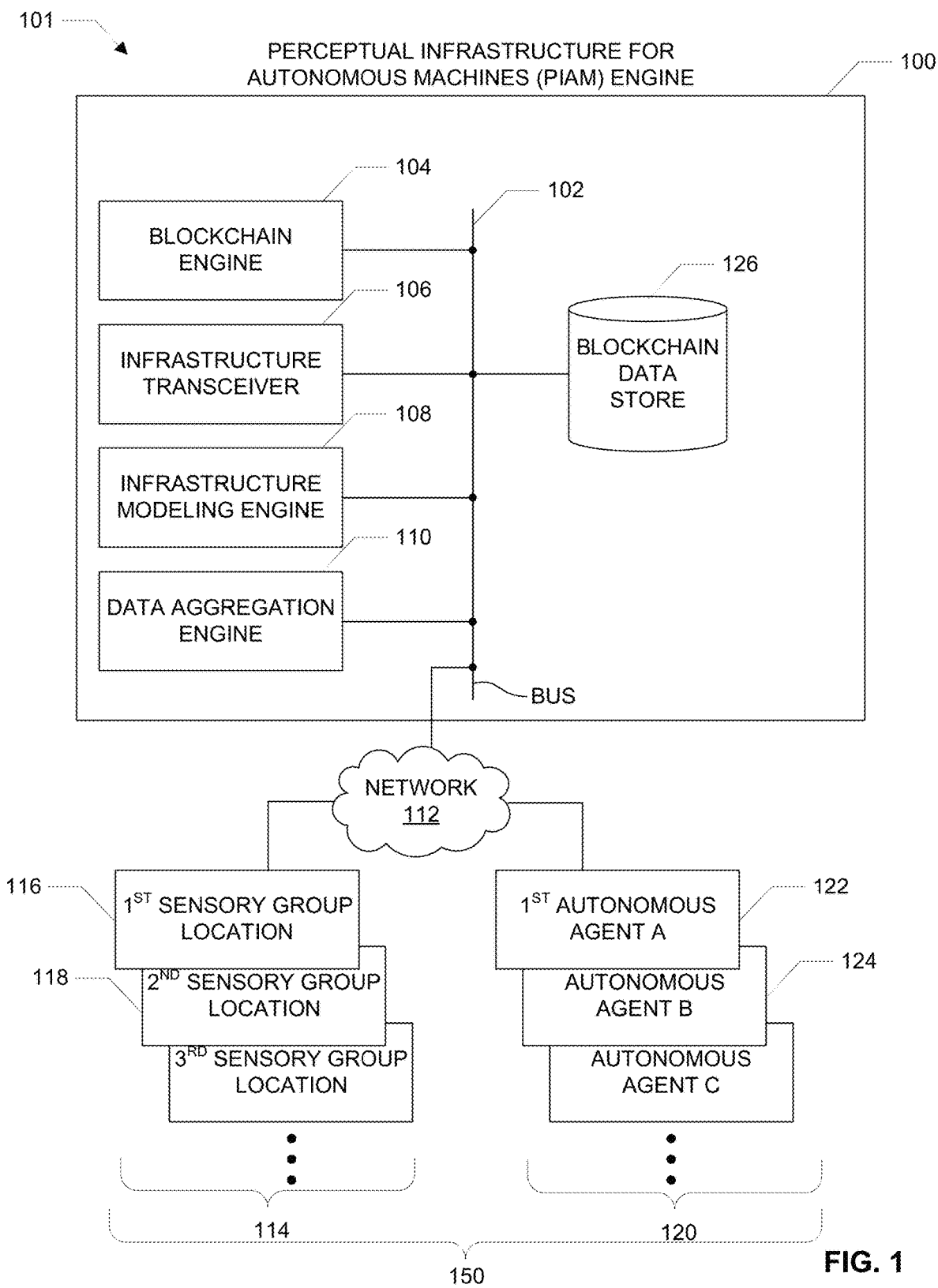
FIG. 1 is a schematic illustration of an example autonomous agent environment including an example perceptual infrastructure for autonomous machines (PIAM) engine, example autonomous agents and example sensory groups constructed in accordance with the teachings of this disclosure.

Operation of autonomous and/or semi-autonomous machines (sometimes referred to herein as "autonomous devices," "autonomous vehicles," "autonomous agents," or more generally "agents") requires substantial amounts of input data associated with complex situations that, when processed, facilitates reactive control to accomplish one or more operational directives (e.g., driving, flying, voice response(s), etc.). For example, as a drone flies through a building, the drone will navigate a path to a destination based on available on-board mapping data and sensory input data collected from on-board sensors, such as radar sensors, light detection and ranging (Lidar) sensors, acoustic sensors, proximity sensors, cameras, etc. However, the drone has limitations regarding on-board storage, sensors, power (e.g., battery), and computing capabilities. In the event the drone maintains network connectivity, the drone may leverage updated mapping data to further assist its navigation when on-board mapping information is no longer relevant (e.g., when the drone navigates away from an area encompassed by the on-board mapping data). Additional map information may not be available despite having network connectivity (e.g., when the drone travels in previously uncharted territories). Yet even when network connectivity is maintained, the drone has a limited perception of its surroundings that are limited to its on-board sensors.

Methods, systems, articles of manufacture and apparatus disclosed herein improve autonomous machine capabilities by, in part, sourcing information from collaborative resources and dynamically adjusting on-board resource allocation. Additionally, examples disclosed herein support the acquisition and sharing of collaborative resources with the aid of blockchain techniques. For instance, a semi-autonomous car travelling down a road may include one or more cameras to process visual data for the purpose of detecting obstacles, such as pedestrians, road maintenance crew personnel, crosswalk signage, etc. In the event the semi-autonomous car is following a relatively large truck, then the one or more cameras of the semi-autonomous car may be occluded from detecting such obstacles. However, in the event the truck is also a network connected agent (e.g., a co-agent), then data collected by one or more sensors of that truck may be provided to the semi-autonomous car to assist in prompt decision making. In some examples, one or more sensors and/or cameras positioned along the road (e.g., cameras mounted at traffic signal equipment) may contribute to a collaborative network (e.g., a cloud network, a blockchain, etc.) to provide real-time information related to obstacles, construction activity, pedestrian presence, traffic flow, etc. As such, example collaborative networks may include heterogeneous agents.

In some disclosed examples, agents include segmented on-board systems. Example systems of an agent include, but are not limited to, navigation systems, ambient sensing systems and route planning logic. Traditional agent systems operate in an independent manner, in which individual on-board systems utilize fixed resources of the agent (e.g., the navigation system includes a corresponding processor, the ambient sensing system includes a separate processor, etc.). Examples disclosed herein facilitate dynamic allocation of agent system resources based on, in part, available input data of the agent, available input data of proximate agent(s), available connectivity to the collaborative network, and/or available on-board power resources.

To illustrate, consider a drone navigating through an area of interest (e.g., a factory building, a forest, a neighborhood) in which the on-board mapping information is robust (e.g., highly granular route detail) and a corresponding route to navigate is orthogonal (e.g., the drone is to travel in one or more straight paths in which all turns are 90-degrees, as distinguished from a non-orthogonal path through a forest). Also, consider that the example drone is navigating the area of interest at dusk when lighting conditions have substantially deteriorated (dropped). Examples disclosed herein employ dynamic computing resources (e.g., hardware-based field programmable gate arrays (FPGAs)) to support system processing (e.g., to support the navigation system processing, the ambient sensing system processing, and the route planning system). Stated differently, by allocating additional computing resources at a task performed by the agent, corresponding task performance may be improved. For example, additional computing resources, when applied, may sample on-board sensors at a higher rate, thereby allowing the agent to propagate through a geographical area of interest at a relatively higher rate of speed and/or with a reduced chance of colliding with obstacles due to the higher sensory sample rate.

Accordingly, examples disclosed herein dynamically adjust processing resources in a manner that improves system efficacy when one or more environmental conditions (e.g., poor lighting conditions) and/or system conditions (e.g., battery level) deteriorate. As such, the example dynamic resource hardware is tailored to allocate greater computing resources (e.g., adjust FPGA resources to the ambient sensors from 50% to 75%) to process available ambient sensing hardware more aggressively in an effort to avoid contact with one or more obstacles during navigation in relatively lower-light conditions.

In still other disclosed examples, consider a first drone (e.g., a first quad-copter) navigating an area of interest together with a second drone (e.g., a second quad-copter) navigating that area of interest. Assume that the first drone is using its navigation systems for itself and also transmits that information to the second drone in an effort to assist the flight path of the second drone. However, if the first drone has only 30% of its remaining power while the second drone has 90% of its remaining power, examples disclosed herein dynamically tailor the dynamic computing resources of the first drone to offload and/or otherwise disable its navigation systems, and dynamically tailor the dynamic computing resources of the second drone to activate its navigation systems for the benefit of both drones. For example, the second drone may perform navigation tasks on behalf of the first drone to preserve power of the first drone. As such, aggregate flight duration for the pair of drones is increased because the first drone can conserve more of its limited power for flight systems alone instead of power resources of the first drone being consumed by both flight systems and navigation systems.

FIG. 1 is a schematic illustration of an autonomous agent environment 101 having an example perceptual infrastructure for autonomous machines (PIAM) engine 100. In the illustrated example of FIG. 1, the PIAM engine 100 includes a bus 102 communicatively connected to a blockchain engine 104, an infrastructure transceiver 106, an infrastructure modeling engine 108, and a data aggregation engine 110. The example bus 102 is communicatively connected to an example network 112 (e.g., a local area network (LAN), a wide area network (WAN), an ad-hoc network, the Internet, etc.), and the example network 112 is communicatively connected to: (a) one or more sensory group locations 114 (e.g., a first sensory group location 116, a second sensory group location 118, etc.) and (b) one or more autonomous agents 120 (e.g., a first autonomous agent 122 (also shown in FIG. 2 as element 200), a second autonomous agent 124, etc.). Taken together, the example sensory group locations 114 and the example autonomous agents 120 form an example collaborative network 150. Additionally, the example bus 102 is communicatively connected to an example blockchain data store 126, which may store one or more models and/or acquired data from the collaborative network 150 (e.g., data acquired from sensors, data acquired from one or more agents (e.g., drones, cars, etc.)). In the illustrated example of FIG. 1, the one or more sensory group locations 114 and the one or more autonomous agents 120 form the collaborative network 150 managed by the example PIAM engine 100.

The example first sensory group location 116 includes one or more sensors at a location of interest. For instance, the first sensory group location 116 may represent a camera mounted to traffic signal equipment at a street intersection, and the second sensory group location 118 may represent a camera and a motion detector mounted to a crosswalk sign. In other words, each sensory group location is not limited to a single sensor. The example autonomous agents 120 may represent a fully or semi-autonomous devices, such as vehicles, drones, personal assistants (e.g., Amazon® Echo®). While the illustrated example of FIG. 1 includes three example sensory group locations and three example autonomous agents, examples disclosed herein are not limited thereto.

In operation, the example infrastructure transceiver 106 monitors the example network 112 for instances of agent data exchanges, such as requests from agents to retrieve information, or requests/offers from agents to provide information. In response to a request, the example infrastructure transceiver 106 performs a challenge/response (e.g., a one-time-unique-hash (OTUH)) to authenticate the agent as an authorized participant of the example PIAM engine 100 or, more generally, an authorized participant of the collaborative network. After satisfying one or more authentication procedures, the example infrastructure transceiver 106 determines if the communication request is to either send or receive information from the example PIAM engine 100. In the event that the agent is making a request for data to be sent from the example PIAM engine 100, the example infrastructure transceiver 106 retrieves relevant data (e.g., from the example blockchain data store 126). In some examples, the requesting agent also provides an indication of its location (e.g., a global-positioning-satellite (GPS) reference) such that the PIAM engine 100 retrieves relevant data (e.g., data from one or more sensors located in a similar geographic area as the requesting agent) for that requesting agent. In some examples, the data aggregation engine 110 retrieves sensory data based on aggregated recommendations regarding which data sources provide abundant and/or otherwise quality (e.g., user-ranked sources) data. In some examples, the blockchain engine 104 facilitates verification of one or more available blockchains and/or audits the one or more available blockchains to identify particular blockchains associated with the example PIAM engine 100 and/or collaborative network 150.

In the event that the agent is making a communication request for the purpose of contributing to the collaborative network, then the example blockchain engine 104 stores the data retrieved from the agent to the example blockchain data store 126. In some examples, the agent (e.g., one or more sensors, a vehicle, a drone, etc.) provides new sensor data that has been acquired in its field of operation. In some examples, the agent provides user feedback/override data and/or updated models (e.g., neural network models, machine learning models, etc.). In still other examples, the data aggregation engine 110 aggregates feedback (e.g., positive, negative, neutral) associated with one or more sources of sensory data to facilitate future recommendations regarding where to source sensory data. In some examples, the future recommendations generated by the example data aggregation engine 110 consider past recommendations. In some examples, the blockchain engine 104 allocates a reward (e.g., monetary rewards) for the one or more data contributions received from participating agents.

In the illustrated example of FIG. 1, the data aggregation engine 110 aggregates data received from any number of participating agents (e.g., the example first autonomous agent 122, the example second autonomous agent 124, etc.) and/or sensory group locations (e.g., the example first sensory group location 116, the example second sensory group location 118, etc.). Additionally, the example infrastructure modeling engine 108 invokes one or more models and/or sub-models to identify, classify and/or otherwise detect objects based on data received from the one or more agents and/or sensory groups. For example, because some agents are power-constrained (e.g., agents that utilize batteries during operation), one or more modeling tasks may be offloaded from the agent to the example PIAM 100, particularly when network connectivity is available. As such, the example infrastructure modeling engine 108 can perform computational processing tasks for the benefit of the relatively less computationally-capable agents, thereby saving scarce power resources of the agent(s).

Figure 2:
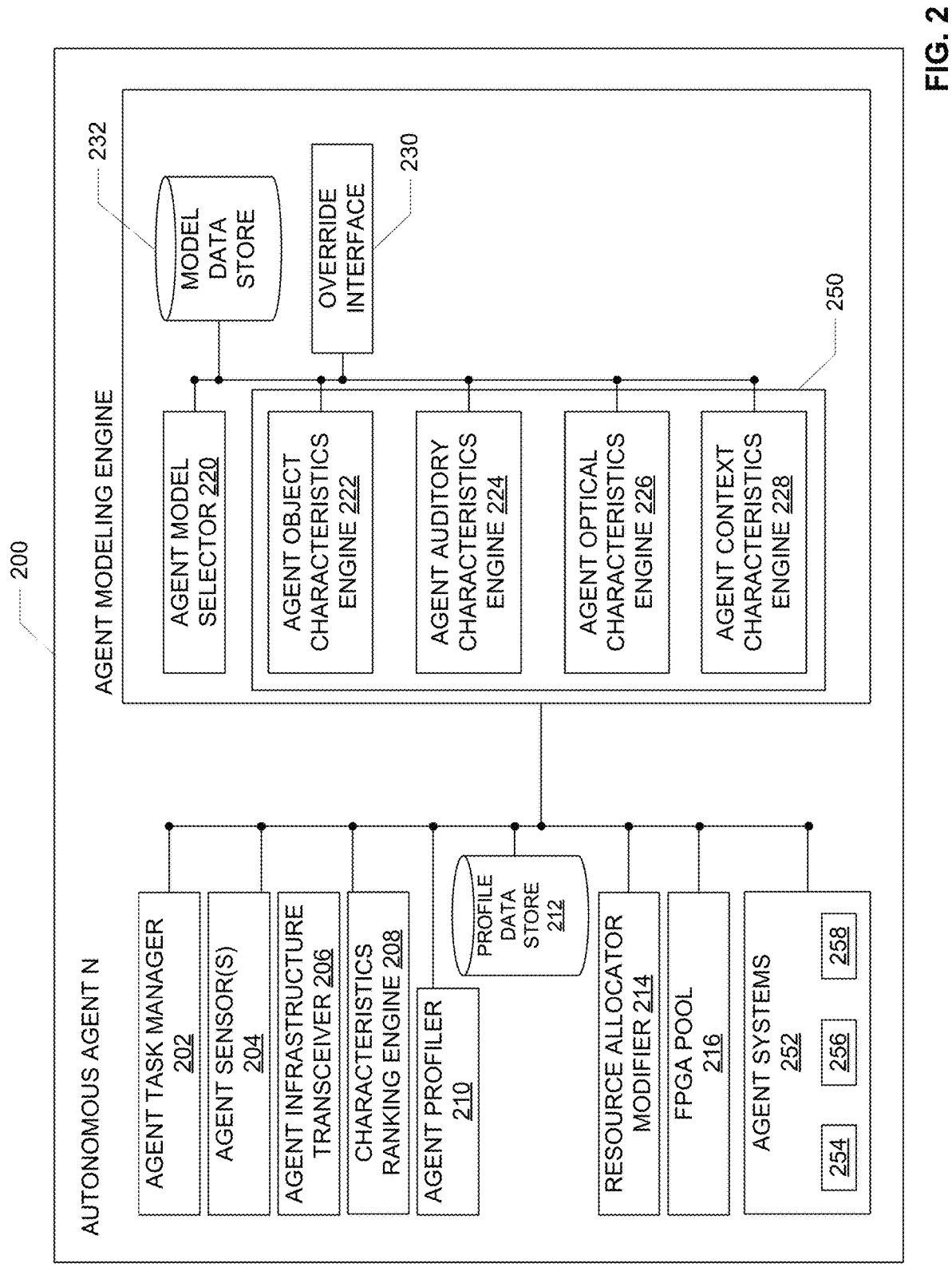
FIG. 2 is a schematic illustration of an example autonomous agent constructed in accordance with the teachings of this disclosure.

FIG. 2 is a schematic illustration of an example autonomous agent 200, such as a vehicle, a drone, a speech assistant, etc. The example autonomous agent 200 could implement any of the first autonomous agent 122, the second autonomous agent 124, etc., of FIG. 1. In the illustrated example of FIG. 2, the autonomous agent 200 includes an example agent task manager 202, example agent sensor(s) 204 (e.g., microphone(s), camera(s), Lidar, accelerometer(s), compass(es), gyroscope(s), etc.), an example agent infrastructure transceiver 206, an example characteristics ranking engine 208, an example agent profiler 210, an example profile data store 212, an example resource allocation modifier 214, and an example field programmable gate array (FPGA) pool 216. The example FPGA pool 216 includes any number of FPGA resources, such as the Stratix® series by Intel®, the Arria® series by Intel®, the Cyclone® series by Intel®, etc. The example autonomous agent 200 also include an example agent modeling engine 218, which includes an example agent model selector 220 and an example agent characteristics engine 250 (e.g., an agent characteristics model), which includes an example agent object characteristics engine 222 (e.g., an agent object characteristics model), an example agent auditory characteristics engine 224 (e.g., an agent auditory characteristics model), an example agent optical characteristics engine 226 (e.g., an agent optical characteristics model), and an example agent context characteristics engine 228 (e.g., an agent context characteristics model). While the example agent characteristics engine 250 of FIG. 2 includes the example agent object characteristics engine 222, the example agent optical characteristics engine 226, and the example agent context characteristics engine 228, examples disclosed herein are not limited thereto. Generally speaking, the example agent characteristics engine 250 and example engines (e.g., models) therein facilitate identification/detection of one or more environmental characteristics and/or corresponding likelihood scores of detected environmental characteristics of the example agent 200. In some examples, one or more engines of the example agent characteristics engine 250 are configured based on, in part, user-defined policies, domain-administrator policies, etc. In the example of FIG. 2, the agent characteristics engine 250 is a means to identify characteristics or an agent characteristics means. The example agent modeling engine 218 also includes an example override interface 230, and an example model data store 232. The example agent 200 also includes any number of agent systems 252 to aid in task operation. In the illustrated example of FIG. 2, the agent systems 252 include an example agent navigation system 254, an example agent ambient sensing system 256 and an example agent route planning system 258. In the example of FIG. 2, the agent navigation system 254 is an agent navigation means, the agent ambient sensing system 256 is an agent ambient sensing means, and the agent route planning system 258 is an agent route planning means. In some examples, one or more systems receive and/or otherwise retrieve configuration and/or operational inputs from one or more models of the example agent characteristics engine 250.

In operation, the example agent task manager 202 determines whether a task is to be initiated by the agent. In the example of FIG. 2, the agent task manager 202 is a means for retrieving data. Agent tasks may include, but are not limited to detecting objects, navigating an area of interest, capturing sensory data, etc. In the event an agent task is to occur, the example agent sensors 204 retrieve sensor input data, and the example agent infrastructure transceiver 206 determines whether the example PIAM 100 and/or whether network connectivity to one or more proximate agents and/or sensors are available. Generally speaking, the example agent sensors 204 reside on and/or otherwise within the example agent 200 as part of a suite of any number of sensors and/or sensor systems. Accordingly, agent sensors 204 that are part of the example agent 200 are referred to herein as native sensors that generate and/or otherwise provide native sensor input data. If so, then the example agent infrastructure transceiver 106 exchanges data therebetween. Stated differently, because a single agent may only have a limited perspective of its surroundings, an exchange of additional sensor data with proximate agents, sensors and/or the example PIAM 100 provides the agent with an improved perception (awareness) of its surroundings. In some examples, the agent infrastructure transceiver 206 accesses blockchain information, such as the example blockchain information in the example blockchain data store 126 of FIG. 1. In the example of FIG. 2, the agent infrastructure transceiver 206 is a transceiver means, a means to retrieve collaborative data, or a means to detect one or more co-agents.

The example agent modeling engine 218 applies one or more models to the acquired data, such as one or more models stored in the example model data store 232. In some examples, the agent model selector 220 determines whether the agent task is associated with object detection and/or classification. If so, then the example agent object characteristics engine 222 invokes one or more models to identify, detect and/or otherwise classify objects, and calculates corresponding object characteristic score values, as described in further detail below. In some examples, the agent model selector 220 determines whether the agent task is associated with auditory input. If so, then the example agent auditory characteristics engine 224 invokes one or more models to identify auditory characteristics, and calculates corresponding auditory characteristic scores. In some examples, the agent model selector 220 determines whether the agent task is associated with optical, visual and/or radar input. If so, then the example agent optical characteristics engine 226 invokes one or more models to identify optical/visual characteristics, and calculates corresponding optical characteristic scores. In some examples, the agent context characteristics engine applies contextual model(s) to identify contextual characteristics and calculates corresponding contextual scores. In the example of FIG. 2, the agent model selector 220 is a means to invoke a model, an agent model selector means, or a means to invoke an agent characteristics engine.

FIG. 3 is an example characteristics score table 300 generated by the example agent modeling engine 218 based on values calculated by the example agent object characteristics engine 222, the example agent auditory characteristics engine 224, the example agent optical characteristics engine 226, and/or the example agent context characteristics engine 228. In the illustrated example of FIG. 3, the characteristics score table 300 includes an identified model characteristics column 302 and a score column 304. The example score column 304 includes calculated characteristic score values indicative of a probability of a corresponding characteristic occurring. For instance, the example agent object characteristics engine 222 applies at least one image recognition model on retrieved input data (e.g., image data from one or more on-board cameras) to calculate a score of 0.69, which indicates a 69% likelihood that a vehicle type of a truck (a characteristic) has been identified (see row 306), s score of 0.51, which indicates a 51% likelihood that a vehicle type of a sedan (a characteristic) has been identified (see row 308), and a score of 0.88, which indicates an 88% likelihood that a vehicle type of a sport utility vehicle (SUV) (a characteristic) has been identified (see row 310).

In still other examples, the agent object characteristics engine 222 applies at least one image recognition model on retrieved input data to identify likelihoods associated with other vehicle type characteristics (e.g., an ambulance (see row 312), or one or more other types of objects. For instance, the example agent object characteristics engine 222 applies at least one image recognition model on retrieved input data to identify characteristics associated with debris in the road (see row 314), characteristics associated with pedestrian(s) in the road (see row 316), and/or characteristics associated with road construction (e.g., construction signage) (see row 318). Examples disclosed herein are not limited to object detection models and include calculated likelihoods by the agent auditory characteristics engine 224 to identify characteristics associated with construction activity (e.g., jackhammer audio signatures) (see row 320), characteristics associated with emergency activity (e.g., police whistle, ambulance siren) (see row 322), characteristics associated with proximity to utilities, such as instances of airline activity (see row 324), and/or characteristics associated with weather activity, such as auditory rain signatures (see row 326). In still other examples, the agent optical characteristics engine 226 applies at least one optical recognition model on retrieved input data to identify characteristics associated with fog (see row 328), and/or rain (see row 330).

In some examples, the agent context characteristics engine 228 applies one or more models to identify one or more characteristics related to a context of the agent and derive and/or otherwise calculate corresponding likelihood score values thereof. For instance, the example agent context characteristics engine 228 applies one or more context models to identify a context characteristic related to driving (see row 332), flying (see row 334), freeway travel (see row 336), low speed travel (see row 338), etc.

After modeled characteristic scores are calculated, the example characteristics ranking engine 208 ranks the scores, and the example agent profiler 210 invokes one or more action items based on the ranked characteristics. In some examples, the characteristics ranking engine 208 removes one or more characteristics from consideration in the event a corresponding characteristic score does not satisfy a threshold. For instance, the characteristic associated with road construction (see row 318) has a corresponding score of 0.15, and the auditory characteristic associated with construction (see row 320) is, similarly, low with a corresponding score of 0.10. In some examples, such relatively low (e.g., lower than a threshold value) characteristic scores are removed by the example characteristics ranking engine 208 such that they are not considered in one or more profiling operations, as described below. However, in other examples, removal of relatively low characteristic scores is performed in connection with a policy (e.g., user-defined policy) or other configuration settings. In the example of FIG. 2, the characteristics ranking engine 208 is a means to rank characteristics or, more generally, a ranking means.

Returning to the illustrated example of FIG. 2, the example agent profiler 210 applies the ranked characteristics to an agent profile map, which identifies one or more agent profiles to be invoked based on the ranked characteristics. FIG. 4 illustrates an example agent profile map 400 that may be stored in the example profile data store 212. In the illustrated example of FIG. 4, the agent profile map 400 is a table including an example identified characteristic column 402, an example threshold column 404, an example action column 406, and an example profile column 408. One or more profiles in the example profile column 408 may be invoked by the example agent profiler 210 based on (a) identified characteristics and (b) satisfaction of corresponding threshold value(s). However, invocation of the one or more profiles may be controlled in connection with user-defined configuration settings and/or policies.

For example, in the event one or more models identifies a context-freeway characteristic (see row 410), and that particular identified characteristic satisfies a threshold score greater than 0.50 (50%), then the example resource allocation modifier 214 updates a budget request for resource allocation (computational resources) to the systems associated with route planning. In particular, the example action column 406 identifies that route planning resource allocation is to be reduced by 10% (e.g., reduce the FPGA resources (e.g., FPGA resources of the example FPGA pool 216) allocated to route planning by 10%) when the context-freeway characteristic is identified with a corresponding score greater than 0.50. In the example of FIG. 2, the resource allocation modifier 214 is a means to allocate resources. Generally speaking, computational resources for the purpose of route planning may be less important and/or necessary in the event the agent is travelling on a freeway, which is typically well mapped, straight and free of obstructions (e.g., pedestrians, crosswalks, schoolyards, etc.). In the example of FIG. 2, the agent profiler 210 is a means to compare likelihood scores, an agent profiling means, or a means to profile characteristics.

In some examples, two or more identified characteristics for an agent profile are utilized to determine a corresponding action for the agent. For example, if a context-freeway characteristic has a score greater than 0.50, and a context-granular map detail characteristic has a score greater than 0.70 (see row 412), then the example resource allocation modifier 214 updates a budget request for resource allocation to the systems with route planning to be dropped by 15% (e.g., reduce the FPGA resources directed to route planning by 15%). Worth noting is that, compared to the previous example in which only one characteristic was used to determine agent computational resource distribution/re-allocation, the instant example includes an additional characteristic that provides a greater degree of certainty that route planning computational burdens are relatively low. As such, those computational resources can be redistributed to one or more other agent systems that may require more processing capability. As another example, in the event the example resource allocation modifier 214 determines that an auditory characteristic of emergency personnel includes a score greater than 0.45, an auditory characteristic of rain includes a score greater than 0.40, and an optical characteristic of rain includes a score greater than 0.50 (see row 414), then the example resource allocation modifier 214 updates a budget request for resource allocation to ambient sensing systems to increase by 25% in an effort to be better able to detect potential obstructions in view of poor visibility and/or rainy conditions.

After the example agent profiler 210 and/or the example resource allocation modifier 214 evaluates all candidate conditions of the example agent profile map 400 in an effort to identify one or more resource budget request changes, the example resource allocation modifier 214 compares the budget requests, and reallocates resources to/from one or more agent systems (e.g., navigation systems, sensor input systems, etc.). In some examples, one or more proximate agents (e.g., co-agents) may be present to provide one or more services that the agent is not capable of performing. As described above, in the event a first agent is running low on power resources (e.g., substantial battery drain), then the example agent infrastructure transceiver 206 determines whether one or more co-agents is proximate to the first agent. If so, then the example resource allocation modifier 214 invokes the one or more co-agents to perform one or more services of interest, and disables those services on the agent in an effort to conserve power resources.

In some examples, the example override interface 230 determines whether one or more inputs are received and/or otherwise retrieved that may enhance operation of the agent during its one or more tasks. For instance, a user of the agent may be aware of particular patterns of environmental conditions that the agent will be exposed to during operation, such as particularly crowded pedestrian traffic during certain times of day. The example override interface 230 updates one or more agent models with such information as, for example, one or more override parameters of the one or more agent models.

In some examples, the agent infrastructure transceiver 206 determines whether to contribute agent information to the collaborative network, such as by way of blockchain contribution(s). As discussed above, the agent is capable of gathering sensor data during the course of its task execution, in which collected sensor data may be of use to one or more participants of the collaborative network 150 (e.g., other agents). In addition to agent contribution of sensor data to the blockchain, agents may also provide updated models to the blockchain, such as updated models having particular parameter settings that have been improved (e.g., tuned via machine learning) in view of highly iterated convergence and/or models tuned in view of unique input conditions. As such, in the event one or more co-agents experiences sensory input conditions similar to those already experienced by another agent, the pre-tuned model can be provided to the co-agents with a reduced need for those co-agents to further iterate the model during one or more machine learning processes.

Figure 5:
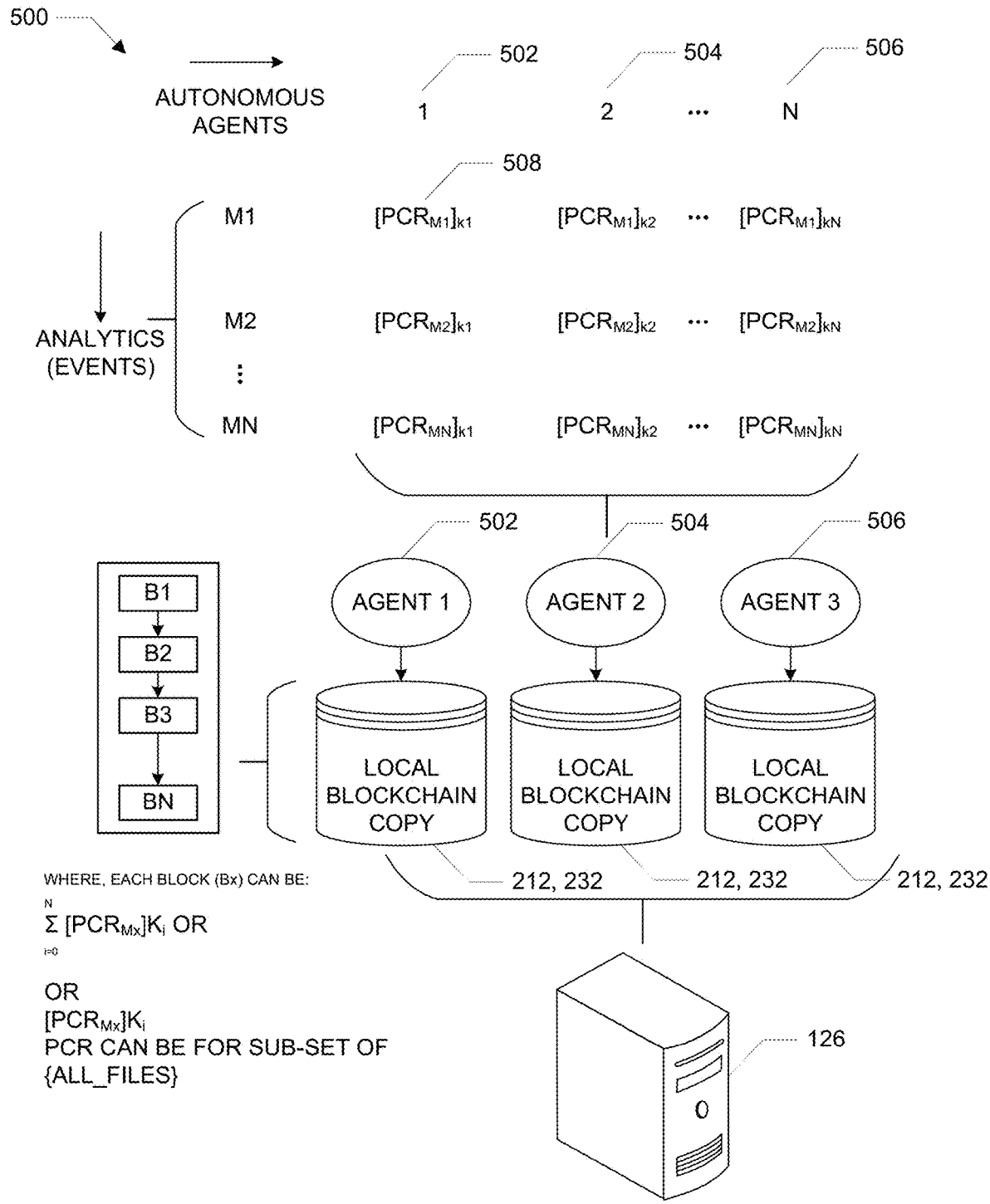
FIG. 5 is an example blockchain environment for use with the example autonomous agent environment of FIG. 1.

FIG. 5 illustrates an example blockchain environment 500. In the illustrated example of FIG. 5, the blockchain environment 500 includes a first agent 502, a second agent 504, and an Nth agent 506. During the operation of the agents, one or more analytic events may occur, such as a first analytic event M1, a second analytic event M2, and an $M^{th}$ analytic event MN. Analytic events may include instances of data acquisition by respective agents and/or instances of model updates by respective agents. In some examples, agents use platform control registers (PCRs) to store data associated with the one or more analytic events, in which the stored data is signed by a key (k) of the agent. For instance, an example first agent collects data associated with the first analytic event M1 and signs the associated data with a private key of the first agent k1 to generate an example signed data packet (508). The example agent modeling engine 218 of each respective agent in the illustrated example of FIG. 5 may generate any number of signed data packets to be stored in a local blockchain copy store, such as within the example model data store 232 or the example profile data store 212. Because each agent signs contributed data with its corresponding private key, contributors may be authenticated by consumers of such information by using a corresponding public key. As such, one or more consumers of blockchain data may discriminate which agent(s) it trusts.

In some examples, the example blockchain data store 126 aggregates local blockchain information from any number of participating agents and/or sensory groups (e.g., the first sensory group location 116, the second sensory group location 118, etc.). However, in some examples blockchain data to be used with the example collaborative network 150 is not sourced from a single location, such as via the example blockchain data store 126 of the example PIAM engine 100. Generally speaking, blockchain data may not be managed by a single source, and contributors to the blockchain data may be verified/authenticated by virtue of respective private/public key utilization. In some examples, the example PIAM engine 100 validates authorized participants of the collaborative network 150, and only signed data packets (e.g., the example signed data packet 508 of FIG. 5) from any blockchain data source will be authorized to participate in the collaborative network 150.

While an example manner of implementing the example autonomous agent environment 101 of FIG. 1 is illustrated in FIGS. 1-5, one or more of the elements, processes and/or devices illustrated in FIGS. 1 and/or 2 may be combined, divided, re-arranged, omitted, eliminated and/or implemented in any other way. Further, the example blockchain engine 104, the example infrastructure transceiver 106, the example infrastructure modeling engine 108, the example data aggregation engine 110, the example blockchain data store 126, the example sensory group locations 114 (e.g., the example first sensory group location 116, the example second sensory group location 118, etc.), the example autonomous agents 120 (e.g., the example first autonomous agent 122, the example second autonomous agent 124, etc.), the example agent task manager 202, the example agent sensors 204, the example agent infrastructure transceiver 206, the example characteristics ranking engine 208, the example agent profiler 210, the example profile data store 212, the example resource allocation modifier 214, the example field programmable gate array (FPGA) pool 216, the example agent modeling engine 218, the example agent model selector 220, the example agent object characteristics engine 222, the example agent auditory characteristics engine 224, the example agent optical characteristics engine 226, the example agent context characteristics engine 228, the example model data store 232, the example override interface 230 and/or, more generally, the example PIAM engine 100 of FIG. 1 and/or the example autonomous agent 200 of FIG. 2 may be implemented by hardware, software, firmware and/or any combination of hardware, software and/or firmware. Thus, for example, any of the example blockchain engine 104, the example infrastructure transceiver 106, the example infrastructure modeling engine 108, the example data aggregation engine 110, the example blockchain data store 126, the example sensory group locations 114 (e.g., the example first sensory group location 116, the example second sensory group location 118, etc.), the example autonomous agents 120 (e.g., the example first autonomous agent 122, the example second autonomous agent 124, etc.), the example agent task manager 202, the example agent sensors 204, the example agent infrastructure transceiver 206, the example characteristics ranking engine 208, the example agent profiler 210, the example profile data store 212, the example resource allocation modifier 214, the example field programmable gate array (FPGA) pool 216, the example agent modeling engine 218, the example agent model selector 220, the example agent object characteristics engine 222, the example agent auditory characteristics engine 224, the example agent optical characteristics engine 226, the example agent context characteristics engine 228, the example model data store 232, the example override interface 230 and/or, more generally, the example PIAM engine 100 of FIG. 1 and/or the example autonomous agent 200 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example blockchain engine 104, the example infrastructure transceiver 106, the example infrastructure modeling engine 108, the example data aggregation engine 110, the example blockchain data store 126, the example sensory group locations 114 (e.g., the example first sensory group location 116, the example second sensory group location 118, etc.), the example autonomous agents 120 (e.g., the example first autonomous agent 122, the example second autonomous agent 124, etc.), the example agent task manager 202, the example agent sensors 204, the example agent infrastructure transceiver 206, the example characteristics ranking engine 208, the example agent profiler 210, the example profile data store 212, the example resource allocation modifier 214, the example field programmable gate array (FPGA) pool 216, the example agent modeling engine 218, the example agent model selector 220, the example agent object characteristics engine 222, the example agent auditory characteristics engine 224, the example agent optical characteristics engine 226, the example agent context characteristics engine 228, the example model data store 232, the example override interface 230 and/or, more generally, the example PIAM engine 100 of FIG. 1 and/or the example autonomous agent 200 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example autonomous agent environment 101 of FIG. 1 may include one or more elements, processes and/or devices in addition to, or instead of, those illustrated in FIGS. 1-3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the example autonomous agent environment 101, the example PIAM engine 100 and/or the example autonomous agent 200 of FIGS. 1 and/or 2 are shown in FIGS. 6-9. The machine readable instructions may be a program or portion of a program for execution by a processor such as the processor 1012 shown in the example processor platform 1000 discussed below in connection with FIG. 10. The program(s) may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 6-9, many other methods of implementing the example autonomous agent environment 101, the example PIAM engine 100 and/or the example autonomous agent 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6-9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 6:
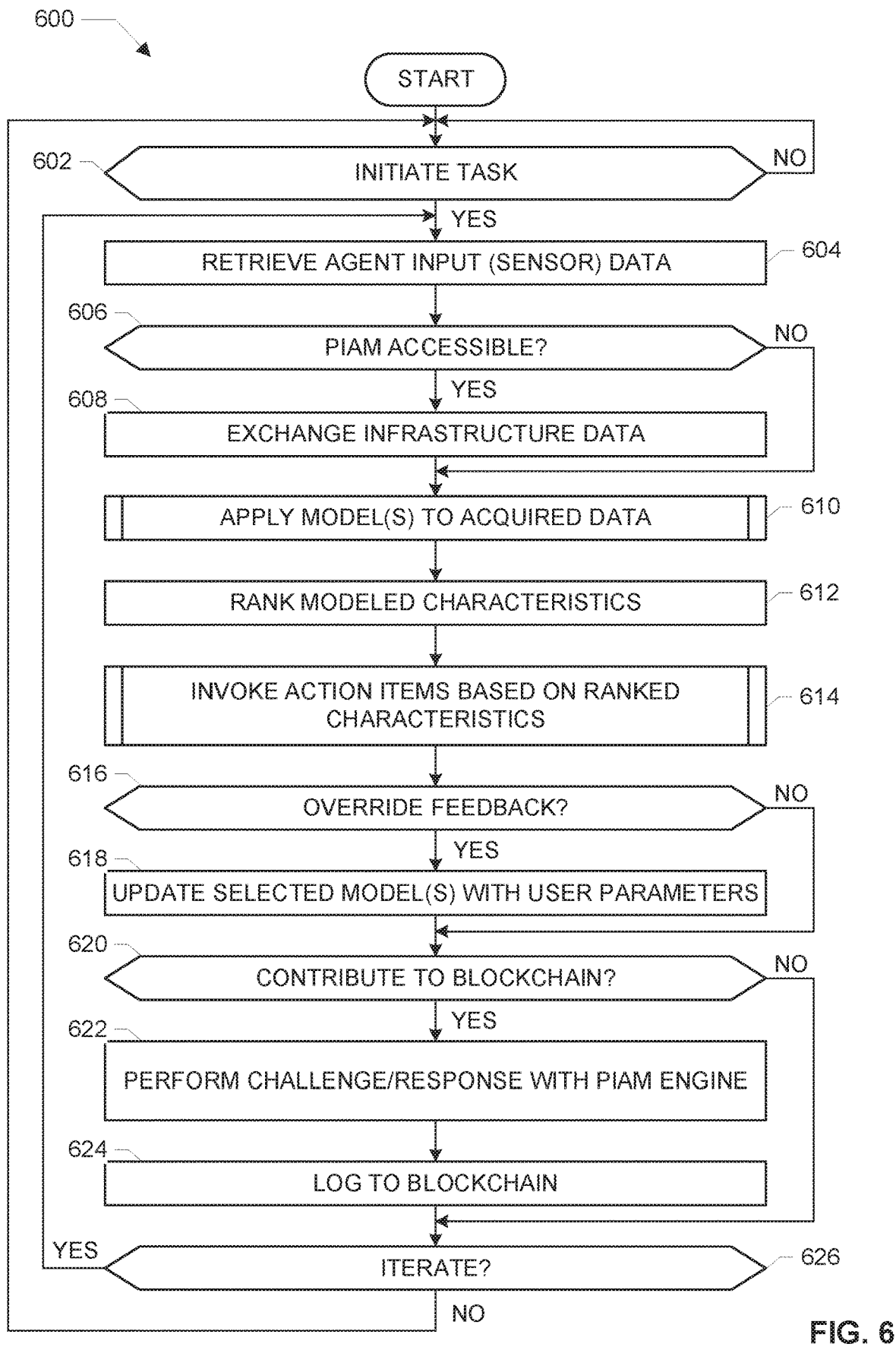
FIGS. 6-9 are flowcharts representative of machine readable instructions that may be executed to implement the example PIAM engine, the example agents and, more generally, the example autonomous agent environment of FIGS. 1-5.

The program 600 of FIG. 6 includes block 602, in which the example agent task manager 202 determines whether a task should be initiated. In some examples, the example agent (e.g., the example first autonomous agent 122 of FIG.

1 (shown as autonomous agent 200 in FIG. 2)) initiates a task based on a sensory trigger input and/or based on a temporal trigger (e.g., periodic, aperiodic, scheduled, manual, etc.). Absent one or more triggers, the example task manager 202 continues to monitor for such occurrences (block 602). In some examples, one of the agent sensors is always active to serve as a primary sensory trigger, such as a motion sensor. Stated differently, by restricting sensory and/or processing resources of the agent to the example primary trigger, power resources may be conserved until an input occurs that is indicative of circumstances where additional sensory and/or computational resources are required, as described in further detail below.

In response to a trigger (block 602) (e.g., a time-based trigger, a primary sensory trigger, etc.), the example agent task manager 202 retrieves sensory input data from on-board agent sensor(s) 204 (block 604) in an effort to obtain a more robust amount of information of the environment of the agent. Additionally, the example agent infrastructure transceiver 206 determines whether the example PIAM engine 100 and/or the example collaborative network 150 is accessible (block 606). As described above, the example agent 200 may not always maintain successful communication with one or more networks, such as the example collaborative network 150. In such examples where the agent 200 does not have communication capabilities with the example collaborative network 150 and/or the example PIAM engine 100, then the agent 200 must rely on its own agent sensors 204 and/or one or more stored models (e.g., one or more models stored in the example model data store 232) of the example agent modeling engine 218. However, in circumstances where the example agent 200 has communication capabilities with the example collaborative network 150 and/or the example PIAM engine 100 (block 606), then the example agent infrastructure transceiver 206 exchanges available sensor and/or modeling data (block 608) that may improve environmental and/or situational perception of the example agent 200. In still other examples, the PIAM engine 100 may not be accessible, but one or more co-agents of the example collaborative network 150 are accessible (e.g., via an ad-hoc network configuration). As described above, in some examples the agent 200 requests available sensor data related to a geofence of interest, such as other agent sensor data or modeling data from one or more agents in a similar geolocation. In still other examples, the agent 200 requests available updated modeling data indicative of one or more models that have been trained in connection with circumstances similar to that of the requesting agent 200, such as models trained in view of rain conditions, snow conditions, traffic volume conditions, etc.

Figure 7:
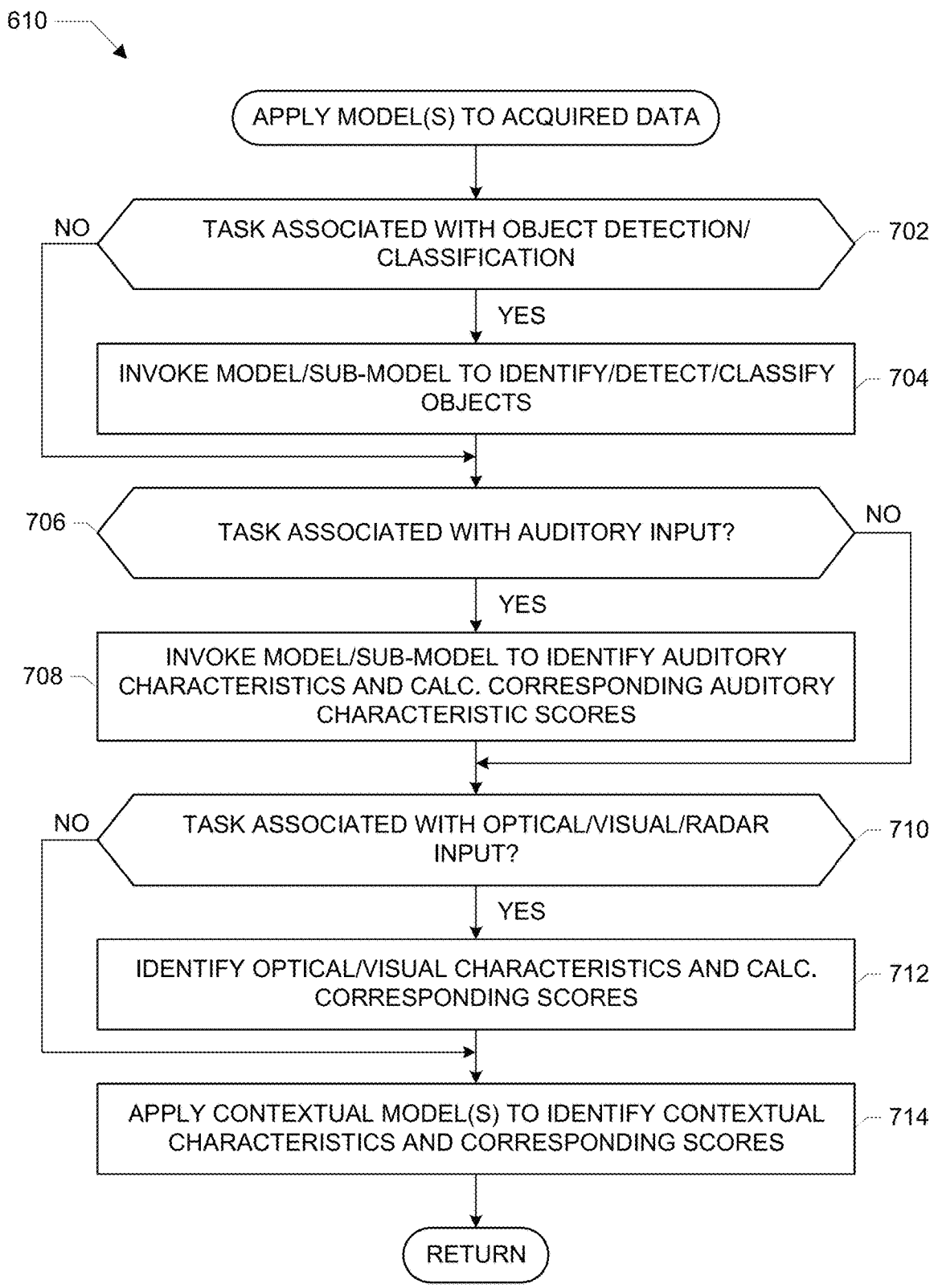

The example modeling engine 218 applies one or more models to the data acquired by the example agent 200 and/or the data acquired from the example agent infrastructure transceiver 206 (block 610), as described in further detail in connection with FIG. 7. In the illustrated example of FIG. 7, the example agent model selector 220 determines if the agent 200 task is associated with object detection/classification efforts (block 702). If so, the example agent characteristics engine 250 invokes one or more specific characteristics engine(s) to identify and/or otherwise detect one or more environmental characteristics of the agent 200 and corresponding likelihood scores of such detected environmental characteristics. In some examples, the example agent object characteristics engine 222 invokes one or more models/sub-models to identify, detect and/or otherwise classify objects, and calculates corresponding characteristic scores (block 704) indicative of a likelihood of the detected object characteristic (e.g., a percentage likelihood score, a numeric likelihood value bounded between zero and one, etc.). The example models/sub-models may be retrieved by the example agent object characteristics engine 222 from the example agent model store 232.

The example agent model selector 220 also determines if the agent 200 task is associated with one or more other tasks that may have an associated model/sub-model that will assist in completion of that task. For example, the agent model selector 220 determines if the agent 200 task is associated with auditory input(s) (block 706). If so, then the example agent auditory characteristics engine 224 invokes one or more models/sub-models to identify auditory characteristics, and calculates corresponding auditory characteristic scores (block 708) indicative of a likelihood of the detected auditory characteristic. The example agent model selector 220 also determines if the agent 200 task is associated with optical, visual, radar, etc., input(s) (block 710). If so, the example agent optical characteristics engine 226 invokes one or more models/sub-models to identify such characteristics and calculates corresponding optical characteristic scores (block 712) indicative of a likelihood of the detected optical characteristic. The example agent context characteristics engine 228 also applies one or more models/sub-models to determine one or more contextual characteristics and calculates corresponding context characteristic scores (block 714) indicative of a likelihood of the detected context characteristic. As described above in connection with FIG. 3, the example modeling engine 218 aggregates and stores the calculated scores in the example characteristic score table 300.

Returning to the illustrated example of FIG. 6, the example characteristics ranking engine 208 ranks the modeled characteristics (block 612). For instance, one or more models may identify particular characteristics having a corresponding score (e.g., percentage likelihood) that does not satisfy (e.g., less than) a threshold value, such as the example auditory-construction characteristic of FIG. 3, which illustrates a relatively low score of 0.10 (e.g., a 10% likelihood that auditory sensory inputs are indicative of construction activity). Such characteristics that do not satisfy corresponding threshold values may be discarded during future analysis efforts, thereby reducing computational efforts during later analysis.

Figure 8:
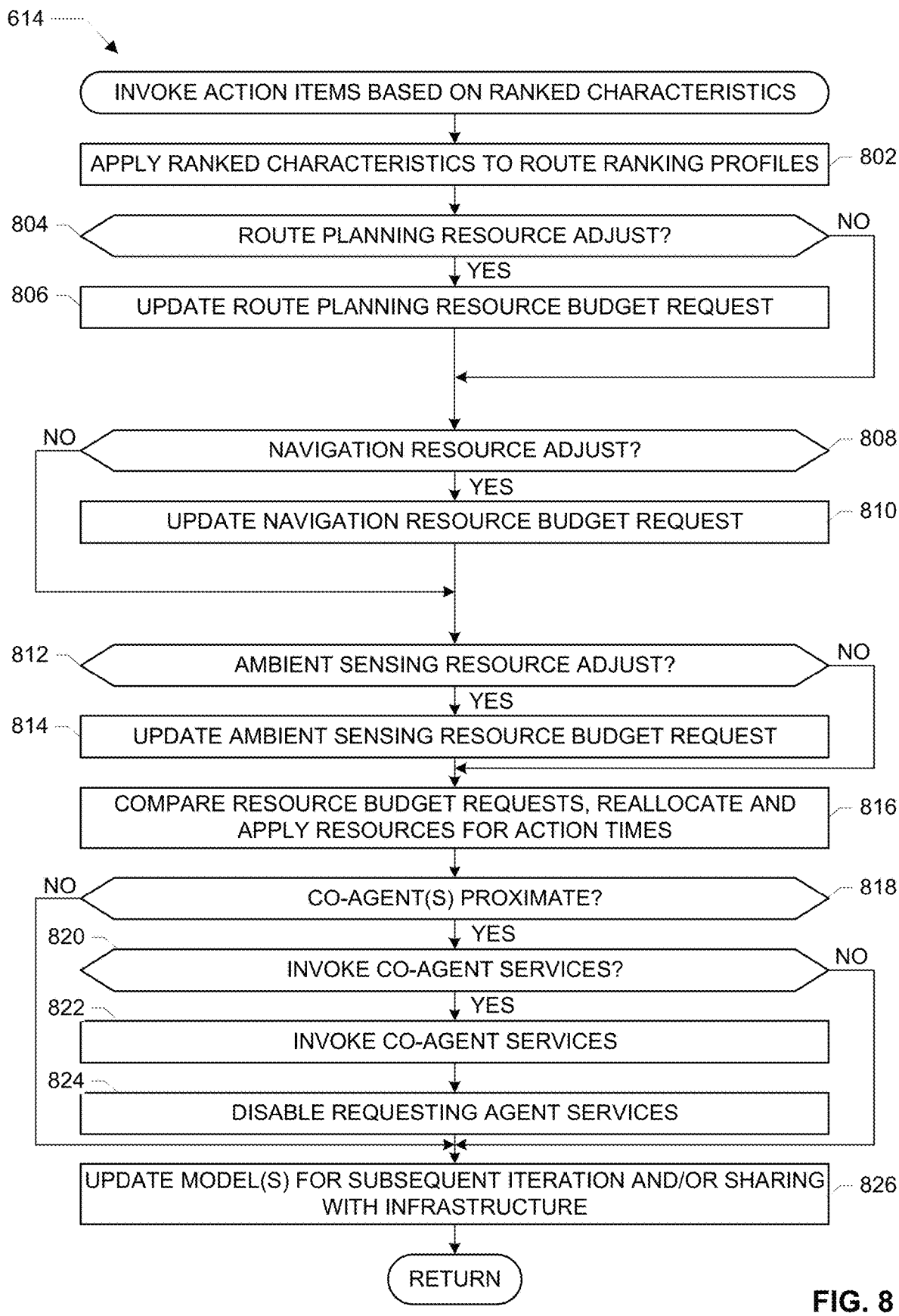

The example agent profiler 210 invokes one or more action items based on the ranked characteristics (block 614), as described in further detail in FIG. 8. In the illustrated example of FIG. 8, the example agent profiler 210 applies ranked characteristics to an agent profile map (block 802), such as the example agent profile map 400 of FIG. 4. The example resource allocation modifier 214 determines whether the ranked characteristics invoke a route planning resource adjustment (block 804). Generally speaking, the example agent 200 may include an initial (e.g., default) resource allocation profile that distributes its on-board computational resources (e.g., FPGAs) to one or more on-board systems. For example, the default resource allocation profile may identify that 25% of the FPGA resources in the example FPGA pool 216 are dedicated to the on-board navigation system, 25% of the FPGA resources in the example FPGA pool 216 are dedicated to the ambient sensing system, and 25% of the FPGA resources in the example FPGA pool 216 are dedicated to the route planning system. In some examples, remaining unused resources of the example FPGA pool 216 are not utilized to conserve power resources and/or to allow for future computational demands during task operation of the agent 200. As such, during task operation(s) of the agent 200, the example resource allocation modifier 214 reallocates and/or otherwise redistributes computational resources (e.g., FPGA resources in the example FPGA pool 216) to one or more systems in a dynamic manner.

Any number of agent profiles may include corresponding associated characteristic triggers and related threshold score values, such as the example route plan profile 450 of FIG. 4. In this example, if the resource allocation modifier 214 identifies that an example context-freeway characteristic 452 satisfies an associated threshold value as being greater than 50% (454) (see row 410 of FIG. 4), then the example resource allocation modifier 214 updates a corresponding route planning resource budget request (block 806) in a manner consistent with an associated action 456. Continuing with the aforementioned example, the associated action 456 is a request to reduce route planning resource allocation (e.g., an allocation of FPGA resources of the example FPGA pool 216) by 10%. While the illustrated example of FIG. 8 includes an example route planning profile, an example navigation profile, and an example ambient sensing profile, examples disclosed herein are not limited thereto.

The example resource allocation modifier 214 also determines whether the ranked characteristics invoke a navigation resource adjustment (block 808). If so, then the example resource allocation modifier 214 updates a corresponding navigation resource budget request (block 810). The example resource allocation modifier 214 also determines whether the ranked characteristics invoke an ambient sensing resource adjustment (block 812) and, if so, updates a corresponding ambient sensing budget request (block 814). The aforementioned budget requests are compared by the example resource allocation modifier 214 to reallocate and apply resources (e.g., FPGA resources) in a manner consistent with one or more requested action items (e.g., reduce route planning resources by 10%, increase navigation resources by 15%, etc.) (block 816).

In some examples, one or more co-agents may be proximate to the agent 200 chartered with performing one or more tasks. The example agent infrastructure transceiver 206 determines whether one or more co-agents are available and/or otherwise proximate to the agent 200 (block 818). If so, the example resource allocation modifier 214 determines whether to invoke one or more services of one or more available co-agents (block 820). In some examples, the resource allocation modifier 214 may identify a circumstance where the requested resource budget allocation adjustment(s) cannot be completely accommodated by the example agent 200 (e.g., the agent 200 does not have a resource capability to increase resource allocation to one or more systems). If so, then one or more co-agents may apply its resources in a shared manner to accomplish one or more designated tasks of the agent 200. The example resource allocation modifier 214 invokes co-agent services (block 822) (e.g., offload sensor data acquisition resources of the agent 200 (block 824) and applies those sensor data tasks to the available co-agent(s)).

The example agent modeling engine 218 updates one or more models of the agent 200 for subsequent iteration and/or sharing with the infrastructure (e.g., the example collaborative network 150 and/or the example PIAM engine 100) (block 826). For instance, the agent 200 applies one or more models to perform its tasks and, based on new and/or alternate sensory input data and/or results of task operation(s), updates the model(s) with tuned parameters. Such tuned parameters illustrate a degree of machine learning applied to the one or more models of the agent 200 that may be helpful to other participants (e.g., co-agents) the infrastructure.

Returning to the illustrated example of FIG. 6, the example override interface 230 determines whether override feedback is available (block 616). For example, while one or more agents may include sensory equipment, empirical observations by users may be provided in an effort to accelerate model tuning and/or machine learning efforts. Example user inputs may include, but are not limited to time-of-day traffic congestion inputs, time-of-day pedestrian patterns, construction activity data, weather conditions, etc. If such override information is available (block 616), the example override interface 230 updates one or more selected models with such override information (e.g., user data, user parameters, etc.) (block 618).

The example agent infrastructure transceiver 206 determines whether the agent 200 is to contribute its information (e.g., acquired sensory data, task results, updated model tuning, etc.) to the collaborative network 150 and/or the PIAM engine 100, such as by way of contribution(s) to the blockchain (block 620). Agent contribution to the blockchain is voluntary and, if selected, the example agent infrastructure transceiver 206 performs authentication of the agent 200 by way of, for example challenge/response procedures with the example PIAM engine 100 of FIG. 1 (block 622) (e.g., via the example blockchain engine 104). The example agent infrastructure transceiver 206 logs contributory data (e.g., sensory data, model data) to the blockchain (block 624). The example agent task manager 202 determines whether the agent 200 is to iterate its current task (block 626) and, if so, control returns to block 604, otherwise control returns to block 602.

Figure 9:
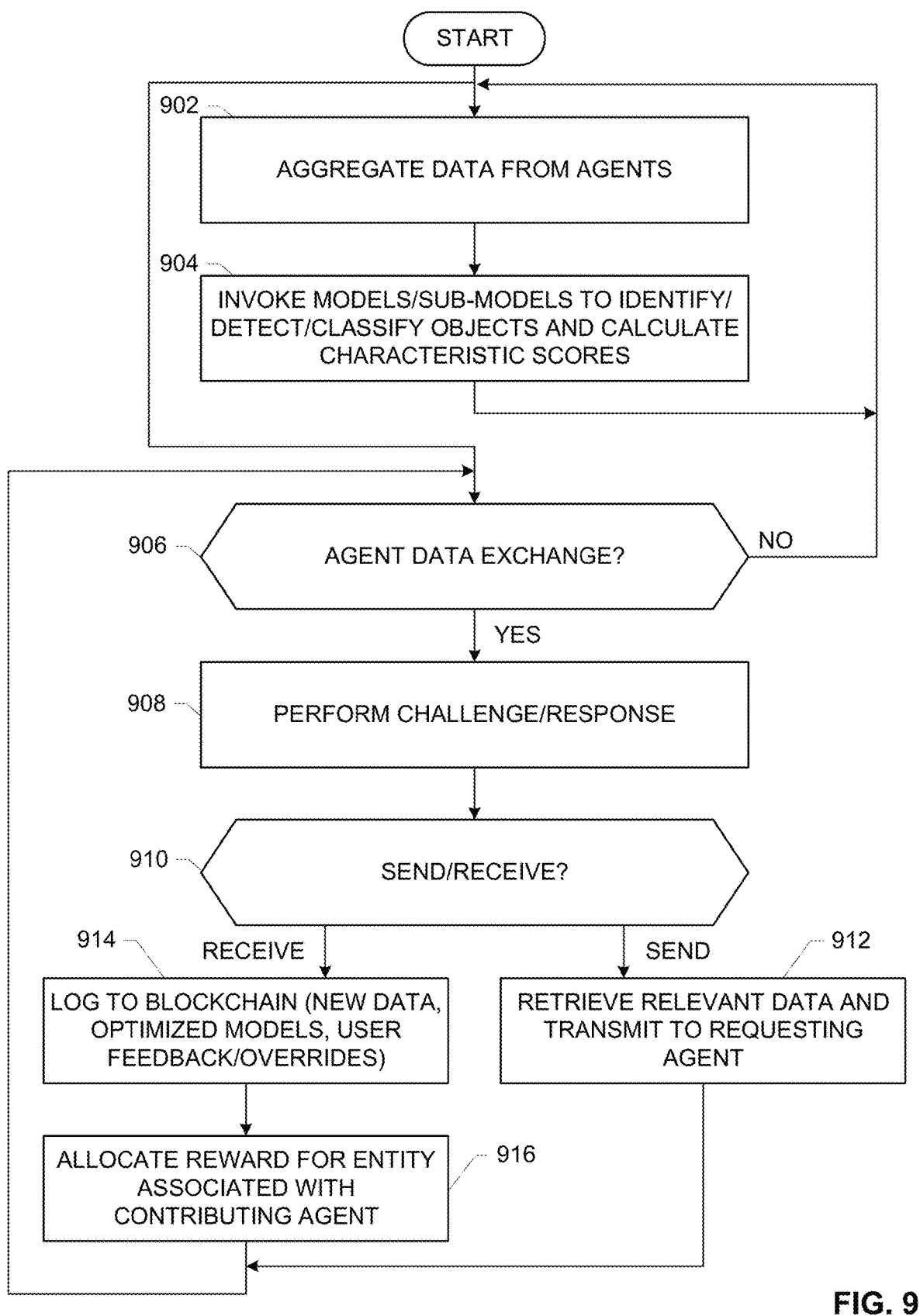

The illustrated example of FIGS. 6-8 above relate to the example agent 200 during task operation, and FIG. 9 below relates to the example PIAM engine 100 operation. In the illustrated example of FIG. 9, the data aggregation engine 110 retrieves and/or otherwise receives and aggregates data from one or more agents of the example collaborative network 150 (block 902). The example infrastructure modeling engine 108 invokes one or more models/sub-models to calculate characteristic scores based on the retrieved and/or otherwise received data from the collaborative network (block 904). In some examples, one or more agents offload machine learning and model calculation efforts to the example infrastructure modeling engine in an effort to conserve on-board power and/or computational resources of the one or more agents. As such, updated models (e.g., updated modeling parameters calculated in connection with retrieved data) are provided back to the one or more agents to be used during agent task operation(s).

The example infrastructure transceiver 106 also initiates a parallel process of the aforementioned model characteristic calculation effort by determining whether one or more agents is to participate in a data exchange (block 906). If not, control returns to block 902, in which the example data aggregation engine 110 continues to retrieve and/or otherwise receive data from agents. Agents involved in a data exchange participate in a challenge/response authentication that is facilitated by the example infrastructure transceiver 106 (block 908). The example infrastructure transceiver 106 determines whether the example PIAM engine 100 is to either send or receive data to/from one or more agents (block 910). In the event one or more agents is requesting that data be sent thereto (block 910), the example infrastructure transceiver 106 retrieves relevant data from, for example, the example blockchain data store 126 and transmits the same to the requesting agent(s) (block 912). As described above, in some examples the data sent to the requesting agent(s) is related to a particular geo-fence area of interest identified by the requesting agent(s) (e.g., a GPS designation).

In the event the example PIAM engine 100 is to receive data from one or more agents (block 910), the example blockchain engine 104 logs the received and/or otherwise retrieved data to a storage facility, such as the example blockchain data store 126 (block 914). The example blockchain engine 104 also allocates one or more rewards to contributing agents (block 916).

Figure 10:
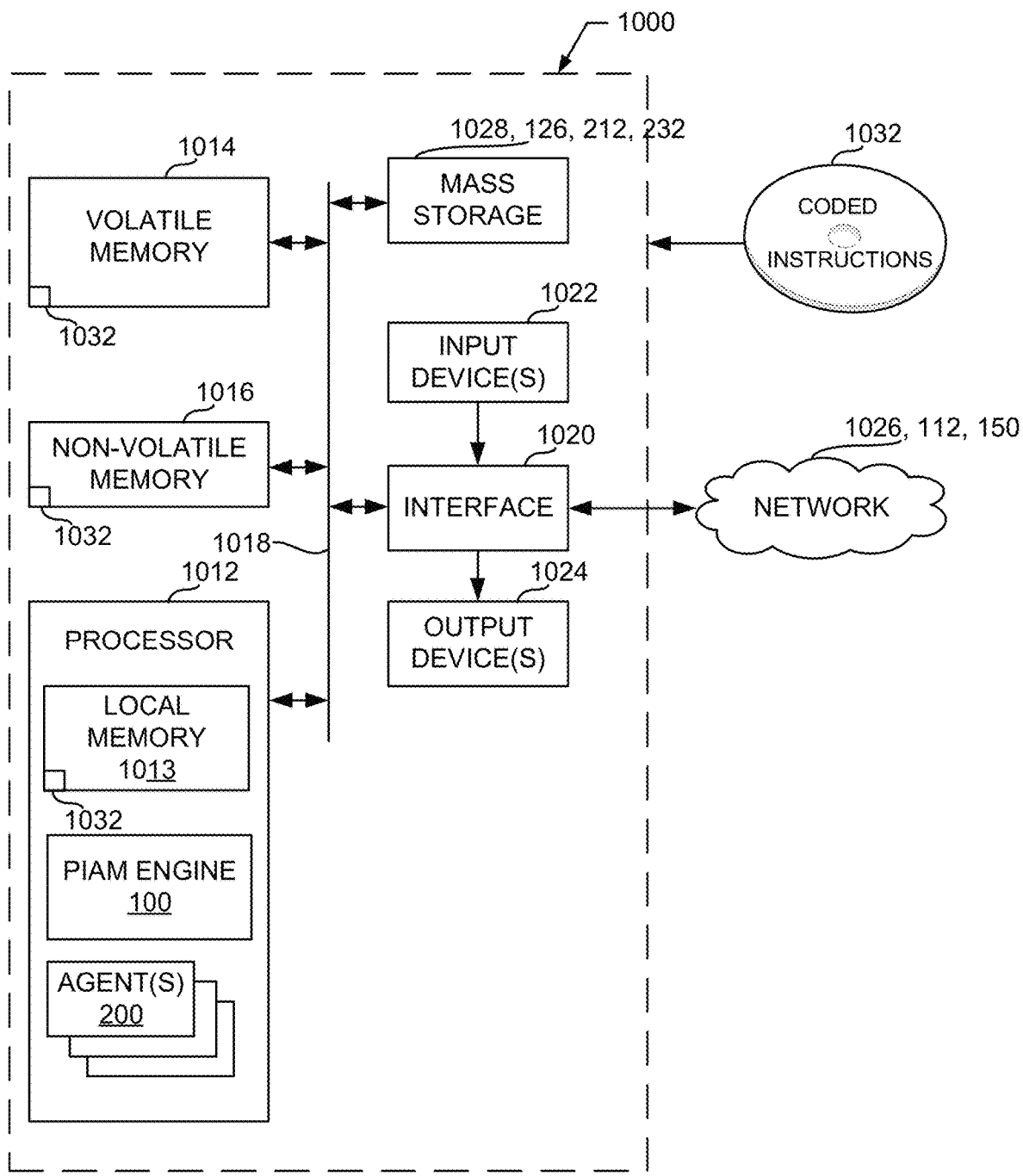
FIG. 10 is a block diagram of an example processing platform structured to execute the instructions of FIGS. 6-9 to implement the example PIAM engine, the example agents and, more generally, the example autonomous agent environment of FIGS. 1-5.

FIG. 10 is a block diagram of an example processor platform 1000 structured to execute the instructions of FIGS. 6-9 to implement the example PIAM engine 100 of FIG. 1, the example agent 200 of FIG. 2 and/or more generally the example autonomous agent environment 101 of FIG. 1. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a gaming console, a set top box, a wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example blockchain engine 104, the example infrastructure transceiver 106, the example data aggregation engine 110 or more generally the example PIAM engine 100. The processor also implements the example agent task manager 202, the example agent sensors 204, the example agent infrastructure transceiver 206, the example characteristics ranking engine 208, the example agent profiler 210, the example resource allocation modifier 214, the example FPGA pool 216, the example agent systems 252, the example navigation system 254, the example ambient sensing system 254, the example route planning system 256, the example agent modeling engine 218, the example agent model selector 220, the example agent characteristics engine 250, the example agent object characteristics engine 222, the example agent auditory characteristics engine 224, the example agent optical characteristics engine 226, the example agent context characteristics engine 228, the example override interface 230 and/or more generally, the example agent 200.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6-9 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, systems, articles of manufacture and apparatus have been disclosed that improve a perception of an agent operating in a collaborative network. Examples disclosed herein do not limit an agent to its own suite of sensors in an effort to learn, detect and/or otherwise understand its operating environment and, instead, facilitate any number of other networked devices, agents and/or sensors in a shared and/or otherwise collaborative manner. Additionally, examples disclosed herein leverage resources of one or more co-agents that may be proximate to the agent chartered with one or more tasks during operation. For instance, a proximate co-agent may have a relatively greater amount of on-board power (battery resources) and/or computational resources (e.g., FPGAs) than the agent performing a task. As such, the agent may request relief and/or assistance from the co-agent to take-on the burden of computational tasks, such as model tuning, environmental sensing and/or route planning. Data from the co-agent may then be transmitted to the agent to be used during task performance.

Example methods, systems, articles of manufacture and apparatus to improve autonomous machine capabilities are disclosed herein. Some such examples and combinations thereof include the following.

Example 1 includes an apparatus to control task operation of an agent, comprising an agent task manager to retrieve native sensor input data from a sensor of the agent, an agent characteristics engine to identify environmental characteristics based on the retrieved native sensor input data, and a resource allocation modifier to allocate a first quantity of resources of the agent based on a likelihood score associated with the environmental characteristics.

Example 2 includes the apparatus as defined in example 1, wherein the resource allocation modifier is to allocate field programmable gate array (FPGA) resources as the first quantity of the resources.

Example 3 includes the apparatus as defined in example 2, wherein the resource allocation modifier is to allocate the FPGA resources of at least one of an agent navigation system, an agent ambient sensing system, or an agent route planning system.

Example 4 includes the apparatus as defined in example 1, further including a characteristics ranking engine to rank the environmental characteristics based on the likelihood score.

Example 5 includes the apparatus as defined in example 4, further including an agent profiler to compare the likelihood score to an agent profile map to determine the first quantity of resources.

Example 6 includes the apparatus as defined in example 1, further including an agent infrastructure transceiver to retrieve collaborative input data from a collaborative network.

Example 7 includes the apparatus as defined in example 6, further including an agent model selector to invoke an agent characteristics engine based on the collaborative input data.

Example 8 includes the apparatus as defined in example 1, further including an agent infrastructure transceiver to determine whether a co-agent is proximate to the agent.

Example 9 includes the apparatus as defined in example 8, wherein the resource allocation modifier is to invoke the first quantity of resources of the co-agent and disable the first quantity of resources on the agent in response to determining the co-agent is proximate to the agent.

Example 10 includes a method to control task operation of an agent, the method comprising retrieving, by executing an instruction with at least one processor, native sensor input data from a sensor of the agent, identifying, by executing an instruction with the at least one processor, environmental characteristics based on the retrieved native sensor input data, and allocating, by executing an instruction with the at least one processor, a first quantity of resources of the agent based on a likelihood score associated with the environmental characteristics.

Example 11 includes the method as defined in example 10, further including allocating field programmable gate array (FPGA) resources as the first quantity of the resources.

Example 12 includes the method as defined in example 11, further including allocating the FPGA resources of at least one of an agent navigation system, an agent ambient sensing system, or an agent route planning system.

Example 13 includes the method as defined in example 10, further including ranking the environmental characteristics based on the likelihood score.

Example 14 includes the method as defined in example 13, further including comparing the likelihood score to an agent profile map to determine the first quantity of resources.

Example 15 includes the method as defined in example 10, further including retrieving collaborative input data from a collaborative network.

Example 16 includes the method as defined in example 15, further including invoking an agent characteristics engine based on the collaborative input data.

Example 17 includes the method as defined in example 10, further including determining whether a co-agent is proximate to the agent.

Example 18 includes the method as defined in example 17, further including invoking the first quantity of resources of the co-agent and disabling the first quantity of resources on the agent in response to determining the co-agent is proximate to the agent.

Example 19 includes one or more non-transitory machine-readable storage media comprising machine-readable instructions that, when executed, cause one or more processor to, at least retrieve native sensor input data from a sensor of an agent, identify environmental characteristics based on the retrieved native sensor input data, and allocate a first quantity of resources of the agent based on a likelihood score associated with the environmental characteristics.

Example 20 includes the one or more non-transitory machine-readable storage media as defined in example 19, wherein the instructions, when executed, cause the one or more processors to allocate field programmable gate array (FPGA) resources as the first quantity of the resources.

Example 21 includes the one or more non-transitory machine-readable storage media as defined in example 20, wherein the instructions, when executed, cause the one or more processors to allocate the FPGA resources of at least one of an agent navigation system, an agent ambient sensing system, or an agent route planning system.

Example 22 includes the one or more non-transitory machine-readable storage media as defined in example 19, wherein the instructions, when executed, cause the one or more processors to rank the environmental characteristics based on the likelihood score.

Example 23 includes the one or more non-transitory machine-readable storage media as defined in example 22, wherein the instructions, when executed, cause the one or more processors to compare the likelihood score to an agent profile map to determine the first quantity of resources.

Example 24 includes the one or more non-transitory machine-readable storage media as defined in example 19, wherein the instructions, when executed, cause the one or more processors to retrieve collaborative input data from a collaborative network.

Example 25 includes the one or more non-transitory machine-readable storage media as defined in example 24, wherein the instructions, when executed, cause the one or more processors to invoke an agent characteristics engine based on the collaborative input data.

Example 26 includes the one or more non-transitory machine-readable storage media as defined in example 19, wherein the instructions, when executed, cause the one or more processors to determine whether a co-agent is proximate to the agent.

Example 27 includes the one or more non-transitory machine-readable storage media as defined in example 26, wherein the instructions, when executed, cause the one or more processors to invoke the first quantity of resources of the co-agent and disable the first quantity of resources on the agent in response to determining the co-agent is proximate to the agent.

Example 28 includes a system to control task operation of an agent, the system comprising means for retrieving native sensor input data from a sensor of the agent, means for identifying environmental characteristics based on the retrieved native sensor input data, and means for allocating a first quantity of resources of the agent based on a likelihood score associated with the environmental characteristics.

Example 29 includes the system as defined in example 28, wherein the means for allocating the first quantity of the resources is to allocate field programmable gate array (FPGA) resources as the first quantity of the resources.

Example 30 includes the system as defined in example 29, wherein the means for allocating the first quantity of the resources is to allocate the FPGA resources of at least one of an agent navigation means, an agent ambient sensing means, or an agent route planning means.

Example 31 includes the system as defined in example 28, further including a ranking means to rank the environmental characteristics based on the likelihood score.

Example 32 includes the system as defined in example 31, further including an agent profiling means to compare the likelihood score to an agent profile map to determine the first quantity of resources.

Example 33 includes the system as defined in example 28, further including an agent transceiver means to retrieve collaborative input data from a collaborative network.

Example 34 includes the system as defined in example 33, further including an agent model selector means to invoke an agent characteristics means based on the collaborative input data.

Example 35 includes the system as defined in example 28, further including an agent transceiver means to determine whether a co-agent is proximate to the agent.

Example 36 includes the system as defined in example 35, wherein the means for allocating a first quantity of resources is to invoke the first quantity of resources of the co-agent and to disable the first quantity of resources on the agent in response to determining the co-agent is proximate to the agent.

Example 37 includes an apparatus including hardware processing logic to control task operation of an agent, comprising a memory storing instructions, and a processor to execute the instructions to cause the processor to retrieve native sensor input data from a sensor of the agent, identify environmental characteristics based on the retrieved native sensor input data, and allocate a first quantity of resources based on a likelihood score associated with the environmental characteristics.

Example 38 includes the apparatus as defined in example 37, wherein the processor is to allocate field programmable gate array (FPGA) resources as the first quantity of the resources.

Example 39 includes the apparatus as defined in example 38, wherein the processor is to allocate the FPGA resources of at least one of an agent navigation system, an agent ambient sensing system, or an agent route planning system.

Example 40 includes the apparatus as defined in example 37, wherein the processor is to rank the environmental characteristics based on the likelihood score.

Example 41 includes the apparatus as defined in example 40, wherein the processor is to compare the likelihood score to an agent profile map to determine the first quantity of resources.

Example 42 includes the apparatus as defined in example 37, wherein the processor is to retrieve collaborative input data from a collaborative network.

Example 43 includes the apparatus as defined in example 42, wherein the processor is to invoke an agent characteristics engine based on the collaborative input data.

Example 44 includes the apparatus as defined in example 37, wherein the processor is to determine whether a co-agent is proximate to the agent.

Example 45 includes the apparatus as defined in example 44, wherein the processor is to invoke the first quantity of resources of the co-agent and to disable the first quantity of resources on the agent in response to determining the co-agent is proximate to the agent.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to control task operation of an agent, comprising:
    an agent characteristics engine to:
        apply one or more models to native sensor input data from a sensor of the agent to identify first environmental characteristics associated with the agent; and
        determine a likelihood score to indicate a probability of the first environmental characteristics corresponding to second environmental characteristics of an agent profile map, the agent profile map including thresholds and resource adjustments that correspond to respective ones of the second environmental characteristics, the thresholds including a first threshold, the resource adjustments including a first resource adjustment;
    an agent profiler to determine the first resource adjustment of a first quantity of resources of the agent in response to the likelihood score satisfying the first threshold; and
    a resource allocation modifier to allocate the first quantity of the resources of the agent based on the first resource adjustment.

2. The apparatus as defined in claim 1, wherein the resource allocation modifier is to allocate field programmable gate array (FPGA) resources as the first quantity of the resources.

3. The apparatus as defined in claim 2, wherein the resource allocation modifier is to allocate the FPGA resources of at least one of an agent navigation system, an agent ambient sensing system, or an agent route planning system.

4. The apparatus as defined in claim 1, further including a characteristics ranking engine to rank the first environmental characteristics based on the likelihood score.

5. The apparatus as defined in claim 1, further including an agent infrastructure transceiver to:
    authenticate the agent to contribute the native sensor input data as collaborative input data to a blockchain based on a blockchain transaction; and
    retrieve the collaborative input data from a collaborative network in response to the authentication of the agent, the collaborative network based on the blockchain.

6. The apparatus as defined in claim 5, further including an agent model selector to invoke the agent characteristics engine based on the collaborative input data.

7. The apparatus as defined in claim 1, further including an agent infrastructure transceiver to determine whether a co-agent is proximate to the agent.

8. The apparatus as defined in claim 7, wherein the resource allocation modifier is to invoke the first quantity of resources of the co-agent and disable the first quantity of resources of the agent in response to determining the co-agent is proximate to the agent.

9. The apparatus as defined claim 1, wherein the agent profiler is to invoke the first resource adjustment corresponding to the allocation of the first quantity of resources of the agent based on a) the first environmental characteristics and b) a satisfaction of the likelihood score to the first threshold, the first threshold corresponding to a likelihood that the first environmental characteristics exist.

10. A method to control task operation of an agent, the method comprising:
applying, by executing an instruction with at least one processor, one or more models corresponding to native sensor input data from a sensor of the agent to identify first environmental characteristics associated with the agent;
determining, by executing an instruction with the at least one processor, a likelihood score to indicate a probability of the first environmental characteristics corresponding to second environmental characteristics of an agent profile map, the agent profile map including thresholds and resource adjustments that correspond to respective ones of the second environmental characteristics, the thresholds including a first threshold, the resource adjustments including a first resource adjustment;
identifying, by executing an instruction with the at least one processor, the first resource adjustment of a first quantity of resources of the agent in response to the likelihood score satisfying the first threshold; and
allocating, by executing an instruction with the at least one processor, the first quantity of the resources of the agent based on the first resource adjustment.

11. The method as defined in claim 10, further including allocating field programmable gate array (FPGA) resources as the first quantity of the resources.

12. The method as defined in claim 11, further including allocating the FPGA resources of at least one of an agent navigation system, an agent ambient sensing system, or an agent route planning system.

13. The method as defined in claim 10, further including ranking the first environmental characteristics based on the likelihood score.

14. The method as defined in claim 10, further including:
authenticating the agent to contribute the native sensor input data as collaborative input data to a blockchain based on a blockchain transaction; and
retrieving the collaborative input data from a collaborative network in response to the authentication of the agent, the collaborative network based on the blockchain.

15. The method as defined in claim 14, further including invoking an agent characteristics engine based on the collaborative input data.

16. The method as defined in claim 10, further including determining whether a co-agent is proximate to the agent.

17. The method as defined in claim 16, further including invoking the first quantity of resources of the co-agent and disabling the first quantity of resources of the agent in response to determining the co-agent is proximate to the agent.

18. The method as defined in claim 10, further including invoking the first resource adjustment corresponding to the allocation of the first quantity of resources of the agent based on a) the first environmental characteristics and b) a satisfaction of the likelihood score to the first threshold, the first threshold corresponding to a likelihood that the first environmental characteristics exist.

19. One or more non-transitory machine-readable storage media comprising machine-readable instructions that, when executed, cause one or more processors to, at least:
apply one or more models to native sensor input data from a sensor of an agent to identify first environmental characteristics associated with the agent;
determine a likelihood score to indicate a probability of the first environmental characteristics corresponding to second environmental characteristics of an agent profile map, the agent profile map including thresholds and resource adjustments that correspond to respective ones of the second environmental characteristics, the thresholds including a first threshold, the resource adjustments including a first resource adjustment;
identify the first resource adjustment of a first quantity of resources of the agent in response to the likelihood score satisfying the first threshold associated with the second environmental characteristics; and
allocate the first quantity of the resources of the agent based on the first resource adjustment.

20. The one or more non-transitory machine-readable storage media as defined in claim 19, wherein the machine-readable instructions, when executed, cause the one or more processors to rank the first environmental characteristics based on the likelihood score.

21. The one or more non-transitory machine-readable storage media as defined in claim 19, wherein the machine-readable instructions, when executed, cause the one or more processors to determine whether a co-agent is proximate to the agent.

22. The one or more non-transitory machine-readable storage media as defined in claim 21, wherein the machine-readable instructions, when executed, cause the one or more processors to invoke the first quantity of resources of the co-agent and disable the first quantity of resources associated with the agent in response to determining the co-agent is proximate to the agent.

23. The one or more non-transitory machine-readable storage media as defined in claim 19, wherein the machine-readable instructions, when executed, cause the one or more processors to invoke the first resource adjustment corresponding to the allocation of the first quantity of resources of the agent based on a) the first environmental characteristics and b) a satisfaction of the likelihood score to the first threshold, the first threshold corresponding to a likelihood that the first environmental characteristics exist.

24. The one or more non-transitory machine-readable storage media as defined in claim 19, wherein the machine-readable instructions, when executed, cause the one or more processors to allocate field programmable gate array (FPGA) resources as the first quantity of the resources.

25. The one or more non-transitory machine-readable storage media as defined in claim 24, wherein the machine-readable instructions, when executed, cause the one or more processors to allocate the FPGA resources of at least one of an agent navigation system, an agent ambient sensing system, or an agent route planning system.

26. The one or more non-transitory machine-readable storage media as defined in claim 19, wherein the machine-readable instructions, when executed, cause the one or more processors to:
authenticate the agent to contribute the native sensor input data as collaborative input data to a blockchain based on a blockchain transaction; and
retrieve the collaborative input data from a collaborative network in response to the authentication of the agent, the collaborative network based on the blockchain.

27. The one or more non-transitory machine-readable storage media as defined in claim 26, wherein the machine-readable instructions, when executed, cause the one or more processors to invoke an agent characteristics engine based on the collaborative input data.

\* \* \* \* \*